June 2, 1959 — T. B. CRANE — 2,889,060
LOW BED TRAILER
Filed July 2, 1957 — 3 Sheets-Sheet 1
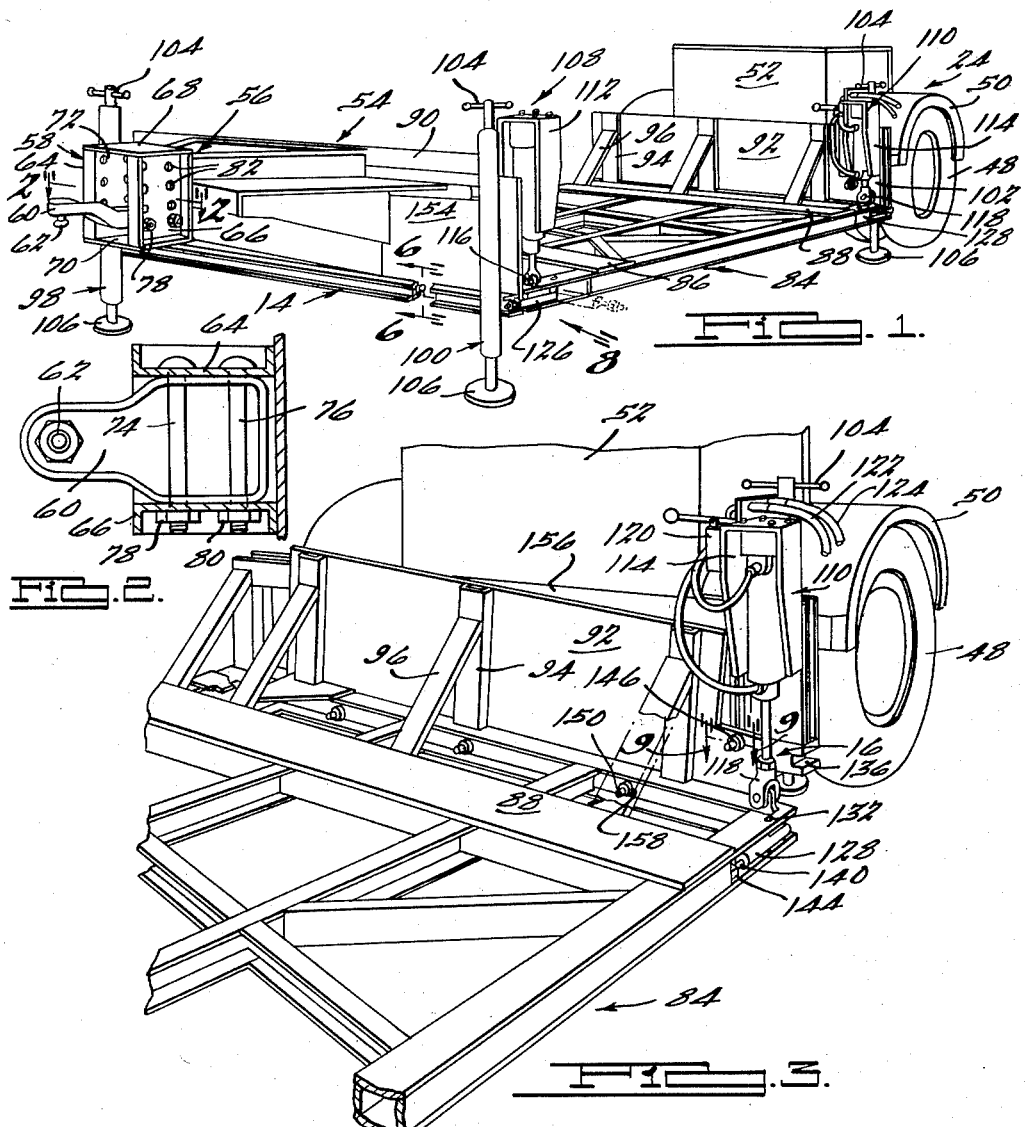
INVENTOR.
Theodore B. Crane
BY
Harness, Dickey & Pierce
ATTORNEYS.

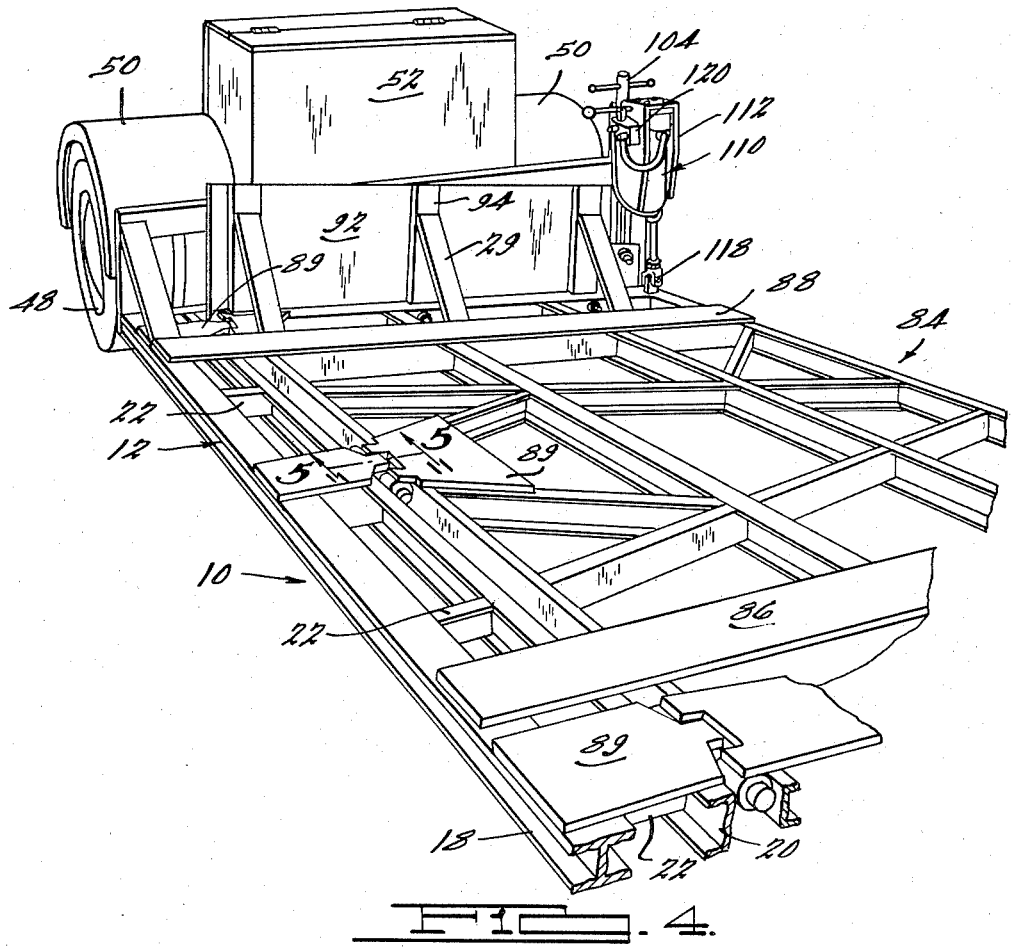

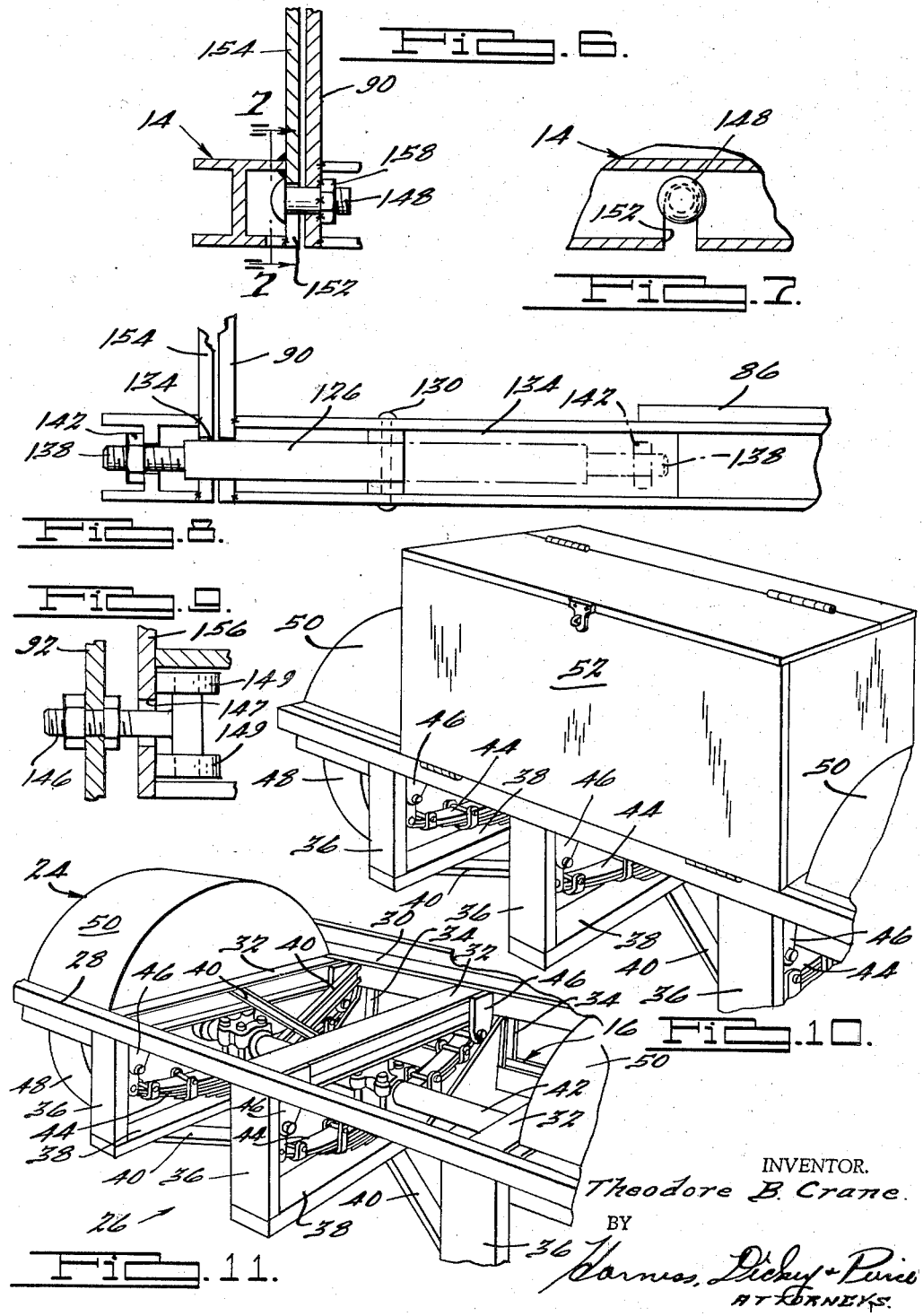

United States Patent Office 2,889,060
Patented June 2, 1959

2,889,060
LOW BED TRAILER
Theodore B. Crane, Detroit, Mich.
Application July 2, 1957, Serial No. 669,587
15 Claims. (Cl. 214—85)

This invention relates to new and useful improvements in low bed trailers of the type adapted for use in hauling machinery, road surfacing equipment, and the like.

An important object of the invention is to provide a low bed trailer that is uniquely constructed to permit loading of equipment to be hauled thereby from the side of the trailer without the use of auxiliary ramps or equivalent means.

Another object of the invention is to provide a low bed trailer of the above mentioned character that can be manufactured relatively inexpensively but is sufficiently sturdy and rugged in construction to carry heavy loads and to withstand rough treatment and abuse to which equipment of this kind normally is subjected in use.

Still another object of the invention is to provide a low bed trailer having a pivoted load carrying platform that can be moved easily and quickly between a normal horizontal load-carrying position and an inclined loading and unloading position.

Yet another object of my invention is to provide a low bed trailer of the above mentioned character that includes means for locking the load-carrying platform securely in the horizontal position.

Other objects and advantages of the invention will be apparent during the course of the following description.

In the drawings forming a part of this specification and wherein like numerals are employed to designate like parts throughout the same:

Figure 1 is a perspective view from the front and one side of a low bed trailer embodying the invention;

Fig. 2 is an enlarged, fragmentary, horizontal sectional view taken on the line 2—2 of Fig. 1;

Fig. 3 is an enlarged, fragmentary, perspective view similar to Fig. 1 but showing the rear portion of the trailer;

Fig. 4 is an enlarged, fragmentary, perspective view particularly illustrating the manner in which the pivoted load-carrying platform is attached to the main frame of the trailer;

Fig. 5 is an enlarged, fragmentary, vertical sectional view taken on the line 5—5 of Fig. 4;

Fig. 6 is an enlarged, fragmentary, vertical sectional view taken on the line 6—6 of Fig. 1;

Fig. 7 is a vertical sectional view taken on the line 7—7 of Fig. 6;

Fig. 8 is an enlarged, fragmentary view looking in the direction of the arrow 8 in Fig. 1;

Fig. 9 is an enlarged, fragmentary, horizontal sectional view taken on the line 9—9 of Fig. 3;

Fig. 10 is a fragmentary, perspective view looking from the rear and one side of the trailer and showing a tool box with which the trailer normally is equipped removed; and Fig. 11 is a view similar to Fig. 10 but showing the tool box removed to illustrate details of the rear wheel suspension.

In the drawing, wherein for the purpose of illustration is shown a preferred embodiment of the invention, the numeral 10 designates the main frame of the trailer. This frame is generally U-shaped to define a longitudinal structural beam portion 12 and integral transverse arm portions 14 and 16. The frame 10 is arranged horizontally relatively close to the ground with the longitudinal beam portion 12 disposed at one side of the trailer and the arm portions 14 and 16 extending transversely thereof at the front and rear respectively. It is important that the frame 10 be strong and rigid, and it can be fabricated in any manner and from any materials that will provide these qualities. In the particular frame here shown by way of illustration, the longitudinal structural member 12 is made from an outer I-beam 18 and an inner channel 20 disposed parallel to and spaced from each other and connected by transverse angle pieces 22. The arms 14 and 16 are similarly formed from conventional structural members. It will be readily appreciated in this connection, however, that the particular construction of the frame elements is not critical insofar as the present invention is concerned. The important thing is that the frame 10 be formed and fabricated so that it is sufficiently strong and rigid to withstand the stresses and strains to which it is subjected in use.

The rear of the trailer is supported by a wheel assembly designated generally at 24, and to this end the arm 16 of the frame 10 carries an elevated reinforced framework 26 to which the wheel assembly is attached as perhaps best shown in Figure 11. The framework 26 comprises a flat horizontal frame disposed above the main frame 10 and having members 28 and 30 arranged transversely of the trailer and connected by a plurality of spaced longitudinal members 32. The inner frame member 30 is connected to the arm 16 by upright supports 34 which preferably are located generally in alignment with the longitudinal members 32. Additional vertical supporting members 36 welded or otherwise connected to and depending from the outer frame member 28 are connected to the arm 16 by horizontal members 38. The box section thus formed is additionally strengthened and reinforced by diagonal struts 40 suitably located and welded or otherwise fastened securely in place.

The wheel assembly 24 comprises a through axle 42 fastened by conventional means to leaf spring assemblies 44 which in turn are suspended from the longitudinal frame members 32 by conventional shackles 46 welded to and depending from the frame members 32. Three spring assemblies 44 are here shown supporting the axle 42 (Fig. 10). One spring assembly 44 is located adjacent to each end of the axle 42 and the other spring assembly is disposed at substantially the middle thereof. Ground engaging wheels 48 are mounted in any suitable or conventional manner on the projecting ends of the axle 42. Fenders 50 on the frame 26 cover the upper portions of the wheels 48. If desired, a box 52 for tools or the like can be mounted on the frame 26 between the fenders 50, as shown in Fig. 10.

Mounted on the front arm 14 of the main frame 10 is an upright supporting structure 54 which carries a forwardly extending draft structure 56; and at the forward end of the draft structure is a stationary box housing 58 which carries a vertically adjustable kingpin carrier 60 having a kingpin 62. In this connection, it will be observed that the box housing 58 comprises laterally spaced upright side members 64 and 66 welded or otherwise secured to the draft structure 56 and interconnected at the top and bottom thereof by plates 68 and 70. This structure defines a front opening 72 through which the kingpin carrier 60 projects. As perhaps best shown in Fig. 2, the kingpin carrier 60 is fastened to the side plates 64 and 66 by bolts 74 and 76, and nuts 78 and 80. A vertical series of aligned holes 82 are provided in the side plates 64 and 66 to receive the bolts 74 and 76 in different vertically adjusted positions of the kingpin carrier 60.

In use, the carrier 60 is adapted to ride up on the lower coupler of a conventional truck-tractor with the kingpin 62 in the V slot of the coupler, and the kingpin is adapted to be fastened securely but detachably by kingpin hooks or other suitable locking means with which couplers of the type described are conventionally equipped. Vertical adjustment of the kingpin carrier 60 is provided to adapt the trailer to different types and sizes of truck-tractors.

Disposed within and carried by the U-shaped main frame 10 is a load supporting platform 84 which is here shown in the form of an open framework. As in the case of the frame 10, the platform 84 is fabricated from conventional structural members. The particular shape of the individual members which comprise the platform 84 and their arrangement in the platform is not a feature of the invention. Suffice it to say that the platform 84 is flat and rigid and sufficiently strong to support the load it is intended to carry.

The particular trailer platform here shown by way of illustration was adapted primarily for carrying an asphalt paving machine of the type shown in the copending application, Serial No. 634,264 which was filed in the Patent Office on January 15, 1957. This particular machine travels on spaced caterpillar treads, and the platform shown here by way of illustration carries correspondingly spaced ways 86 and 88 which support the treads and on which the latter travel during loading and unloading of the machine. The platform 84 entirely fills the space between the arm portions 14 and 16 of the frame 10 and is pivotally attached to the beam 12 by hinge assemblies 90.

In use, the platform 84 is adapted to swing on the hinges 89 between the normally horizontal position shown in Fig. 1 and the inclined position shown in Fig. 3 in which the swinging edge thereof rests upon the ground or other suitable supporting surface. It will be readily apparent that, when the platform 84 is in the latter position, machinery can be easily loaded thereon from the side of the trailer. In the case of the asphalt paving machine hereinabove referred to the machine is simply driven onto the platform over the lowered edge thereof, with the caterpillar tread of the machine traversing and supported by the ways 86 and 88. If necessary, suitable blocks may be provided at the lowered edge of the platform to assist initial movement of the machine onto the ways 86 and 88. However, in most instances, this will not be necessary. The ways 86 and 88 are preferably welded or otherwise fastened securely to the platform 84 and they preferably project beyond the hinged end thereof and overlay the beam 12. When the platform 84 is in the normal horizontal position the projecting ends of the ways 86 and 88 lay flatly against and are supported by the beam 12. However, when the platform 84 is moved to the inclined position the projecting ends of the ways 86 and 88 lift off of and are disposed angularly with respect to the beam.

Upright guard walls 90 and 92 are provided on the platform 84 at the ends thereof and these walls are suitably strengthened and reinforced by upright supports 94 fastened thereto and inclined braces 96 which extend between the supports and suitably located structural members of the platform 84.

Conventional, manually operable, vertically adjustable supports 98, 100 and 102 are provided at each of the front corners of the trailer and at the rear corner thereof adjacent to the swinging edge of the platform 84. These supports have manually rotatable handles 104 that are turned to raise or lower the foot portions 106 thereof. When the handles 104 are turned in one direction the foot portions 106 are lowered to engage the ground and when the handles are rotated in the opposite direction, the foot portions are raised from the ground. When the trailer is in use, the foot portions 106 of the supports 98, 100 and 102 are of course in raised position. When the trailer is to be uncoupled from the truck-tractor the foot portions 106 of the two front supports 98 and 100 are lowered to support the front end of the trailer in the same manner as a conventional trailer landing gear. Also, the foot portion 106 of the rear support 102 is lowered during loading and unloading of the trailer and when in the lowered position it cooperates with the support 100 to prevent the trailer from tipping or rocking particularly when the entire load is concentrated at or adjacent to the swinging edge of the platform 84.

The platform 84 is raised and lowered by power cylinders 108 and 110 attached to the frame of the trailer at opposite ends of the platform 84 and adjacent to the swinging edge thereof. In this connection it will be observed that the forward cylinder 108 is attached to the frame by a mounting bracket 112 and the rear cylinder 110 is attached to the frame by a mounting bracket 114. The piston rod of the forward cylinder 108 is connected to the platform 84 by a clevis connection 116, and the piston rod of the rear cylinder 110 is similarly connected to the platform by clevis connection 118.

The operation of the power cylinders 108 and 110 is controlled, according to conventional practice by suitable valves such as the valve 120 shown in Fig. 3 on the rear cylinder 110. Both cylinders 108 and 110 are equipped with hoses 122 and 124 according to conventional practice, as shown in Fig. 3 in connection with the rear cylinder 110, and these hoses are adapted in any suitable or conventional manner (not shown) for attachment to a suitable source of hydraulic liquid under pressure. Some truck-tractors are conventionally equipped with hydraulic pump systems adapted for connection to the hoses 122 and 124. Similarly, the equipment to be hauled by the trailer may be equipped with hydraulic pump systems that can be used to operate the power cylinders 108 and 110. The asphalt paving machine hereinabove referred to is so equipped. However, it will be readily apparent that, if necessary, or desirable, the trailer itself can be equipped with a hydraulic pump system to service the cylinders 108 and 110.

The platform 84 is locked securely in the raised position by bolts 126 and 128 which are connected to the platform at the swinging edge and adjacent to the ends thereof by pivots 130 and 132, respectively. The bolts 126 and 128 preferably are recessed into the edge of the platform 84, as perhaps best shown in Figs. 1 and 3.

When the bolts 126 and 128 are swung away from the frame 10 they occupy recessed positions in the platform 84, as shown in Fig. 3, and when so positioned the bolts 126 and 128 disengage the frame so that the platform 84 can be raised or lowered by the power cylinders 108 and 110. Also, when the bolts 126 and 128 are in this position they are protected against damage during loading or unloading of the trailer and from other causes. When the platform 84 is in its normal horizontal position the bolts 126 and 128 are in register with recesses 134 and 136 in the ends of the frame 10, and the bolts can be swung outwardly into these recesses to lock the platform securely to the frame. Studs 138 and 140 projecting from the swinging ends of the bolts 126 and 128 carry nuts 142 and 144 that can be tightened against the frame as shown in Fig. 8 to hold the bolts securely in engaged position.

Suitable stops (not shown) preferably are provided for limiting upward swinging movement of the platform 84 and for positioning the platform properly in its normal horizontal position with the bolts 126 and 128 in register with the recesses 134 and 136.

In connection with the foregoing, it will be apparent that the bolts 126 and 128 in addition to holding the platform 84 securely in the elevated position also function to connect the platform to the arms of the frame 10 so as to prevent spreading of the arms under tow or draft stresses. In practice, however, it has been found expedient to reinforce this connecting or holding function of the bolts 126 and 128.

To this end the guard walls 90 and 92 carry outwardly extending T-shaped members 146 which project through arcuate slots 147 in plates 154 and 156 mounted on the frame arms 14 and 16. Wheels 149 journalled on the projecting head portions of the members 146 bear against the outer sides of the plates 154 and 156. The wheels 149 travel on the plates 154 and 156 during pivotal movement of the platform 84 and function at all times to hold the arms 14 and 16 against spreading.

In addition to the above, the front and rear guard walls 90 and 92 of the platform 84 are provided with outwardly extending headed studs 148 and 150 which enter slots 152 in the arm portions of the frame 10 as shown in Figs. 6 and 7 as the platform swings upwardly to the horizontal position. The heads of the studs 148 and 150 may of course cooperate and interconnect in any suitable manner with the particular structure of the frame arms 14 and 16 and this may vary somewhat depending upon the particular construction of the frame. In the form of the invention here shown, however, the arms 14 and 16 are provided at the inner sides thereof with vertical plates 154 and 156 and the notches 152 are provided in the lower edges of the plates, as shown in Fig. 6. In the drawing the plate 154 is shown welded to the front arm 14 and the plate 156 is similarly attached to the rear arm 16. Also it will be observed that the particular studs 148 and 150 here shown by way of illustration are threaded into nuts 158 which are welded to the inner sides of the guard walls 90 and 92. In this manner the studs 148 and 150 can be readily adapted initially to fit properly in the slots 152, and they may be adjusted thereafter from time to time as required to compensate for any changes that may occur in the frame or any variations in spacing that may take place between the arms 14 and 16 and the adjacent ends of the platform 84.

In connection with the foregoing, it will be apparent that the low bed trailer of this invention comprises an elevated wheeled frame 10 having a longitudinal supporting beam portion 12 disposed at one side of the trailer and transverse arm portions 14 and 16. A load supporting platform 84 is disposed between the arm portions 14 and 16 of the frame 10, and one side of the platform is hinged to the longitudinal supporting beam 12 of the frame. By reason of this construction, the load supporting platform 84 is adapted to swing from a normally horizontal position to an inclined position so that machinery and the like can be loaded thereon from the side of the trailer. Power devices 108 and 110 are connected to the frame 10 and to the platform 84, and these devices are operative to move the platform between the horizontal and inclined positions. Means in the form of bolts 126 and 128 are provided for fastening the platform 84 securely to the frame 10 in the horizontal position and when so engaged the bolts relieve the power devices 108 and 110 of the platform load. Adjustable ground engaging props or supports 98, 100 and 102 are attached to the arm portions of the frame 10 at the front of the trailer and adjacent to the ends of the arm portions to support and steady the trailer when it is disconnected from the truck-tractor and during loading and unloading of the trailer. Additional means in the form of headed studs 148 and 150 are provided for interconnecting the platform 84 and the arms of the frame 10 when the platform is in its normal horizontal position to prevent spreading of the arms during operation of the trailer.

What is claimed is:

1. A low bed trailer comprising a generally U-shaped frame having a longitudinal supporting beam portion disposed at one side of the trailer and transverse arm portions, ground engaging running gear behind and supporting one arm portion of the frame, means carried by the other arm of the said frame for coupling the trailer to a truck-tractor or the like, a load supporting platform disposed between the arm portions of said frame hinged to the longitudinal supporting beam portion thereof pivotally movable from a position in the plane of the frame to an inclined position in which the free edge thereof rests upon or substantially upon the ground, actuator means connected to said platform for moving the same from one position to the other, and headed pins on the ends of the platform movable into slots provided in the frame as the platform assumes the normal horizontal position whereby to interlock the platform and the arms of said frame so as to limit spreading of the arms in use and to transmit pulling stresses occurring during operation and use of said trailer from said coupling means to said running gear through said platform.

2. A low bed trailer comprising an elevated wheeled frame having a longitudinal supporting beam portion disposed at one side of the trailer and transverse arm portions at opposite ends of said longitudinal beam portion, said frame being normally generally horizontally positioned so as to be normally essentially parallel with the ground at all times, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and means for detachably fastening said platform to the arm portions of said frame when the platform is in the normally horizontal position for limiting spreading of the arms in use.

3. A low bed trailer comprising an elevated wheeled frame having a longitudinal supporting beam portion disposed at one side of the trailer and transverse arm portions at opposite ends of said longitudinal beam portions, said frame being normally generally horizontally positioned so as to be substantially parallel with the ground at all times, a load supporting platform disposed between the arm portions of said frame and hinged to the longitudinal supporting beam portion thereof adapted to swing from a normal horizontal position to an inclined position so that machinery and the like can be loaded thereon from the side of the trailer, and actuator means for swinging said platform on its hinge between horizontal and inclined positions.

4. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and headed pins on the ends of the platform movable into slots provided in the frame as the platform assumes the normal horizontal position whereby to interlock the platform and the arms of said frame so as to limit spreading of the arms in use and to transmit pulling stresses occurring during operation and use of said trailer through said platform.

5. A low bed trailer comprising a generally U-shaped frame having a longitudinal supporting beam portion disposed at one side of the trailer and transverse arm portions, ground engaging wheels behind and connected to one arm portion of the frame, means carried by the other arm of the said frame for coupling the trailer to a truck-tractor or the like, a load supporting platform disposed between the arm portions of said frame hinged to the longitudinal supporting beam portion thereof and pivotally movable from a position in the plane of the frame to an inclined position in which the free edge thereof rests upon or substantially upon the ground, actuator means connected to the said platform for moving the same from one position to the other, and adjustable ground engaging props on the forward end of the trailer and on the side thereof opposite the supporting beam portion of the trailer frame selectively and collectively operable to hold the said forward end elevated when the trailer is uncoupled from the truck-tractor and to prevent lateral tipping of the trailer during loading and unloading thereof.

6. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, fluid motors having relatively moving power operated parts connected to the frame and platform respectively operative to move the latter between said horizontal and inclined positions, and means for detachably fastening said platform to the arm portions of said frame so as to relieve said fluid motors of the platform load during normal operation of the trailer and to limit spreading of the arms in use.

7. A low bed trailer comprising a normally horizontal U-shaped frame having a longitudinal supporting beam portion disposed at one side of the trailer and transverse arm portions, ground engaging wheels supporting said frame above and spaced from the ground in generally parallel relation thereto a load supporting platform disposed between the arm portions of said frame and hinged to the longitudinal supporting beam portion thereof adapted to swing from a normally horizontal position to an inclined position with the swinging edge thereof on or parallel to the ground so as to permit machinery and the like to be rolled thereon from the side of the trailer, and means operatively connected to the platform to swing the same between said horizontal position and said inclined position.

8. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and interlocking means detachably connecting the ends of said platform and the arm portions of said frame when the platform is in the normally horizontal position.

9. A low bed trailer comprising a wheeled frame having a longitudinal supporting beam portion disposed at one side of the trailer and transverse arm portions, said frame in normal operation of the trailer occupying a generally horizontal position above and spaced from the ground, a load supporting platform disposed between the arm portions of the frame and hinged to the longitudinal supporting beam portion thereof adapted for pivotal movement between a normally horizontal position in the plane of the frame and an inclined position in which the swinging edge thereof rests upon the ground, and power devices connected to the frame and to the platform operative to move the latter between said horizontal and inclined positions.

10. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and pivoted bars on the swinging edge of said platform swingable into grooves in the ends of said arms to detachably connect the platform to the frame and to sustain the weight of the platform during normal operation of the trailer.

11. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, and fluid motors having relatively movable power operated parts connected to the frame and platform respectively and operative to move the latter between said horizontal and inclined positions, and means rendered operative automatically by movement of said platform to the horizontal position to connect said platform to the arm portions of said frame so as to limit spreading of the arms in use and to transmit pulling stresses occurring during operation and use of the trailer through said platform.

12. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, upright wear plates on said arms having vertical slots therein, and connecting devices fastened to said platform extending through said slots and carrying rollers bearing on the outer sides of the wear plates, said rollers adapted to travel on said wear plates during pivotal movement of said platform to prevent warping and spreading of said frame.

13. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and adjustable ground engaging props attached to the arm portions of the frame adjacent to the ends thereof for supporting and steadying the trailer particularly during loading and unloading thereof.

14. A low bed trailer comprising an elevated wheeled frame having a longitudinal supporting beam portion disposed at one side of the trailer and transverse arm portions, a load supporting platform disposed between the arm portions of said frame and hinged to the longitudinal supporting beam portion thereof adapted to swing from a normal horizontal position to an inclined position so that machinery and the like can be loaded thereon from the side of the trailer, actuator means for moving said platform between the horizontal and inclined positions, and means interconnecting said platform and said arms when the platform is in its normally horizontal position to prevent spreading of said arms during operation of the trailer.

15. A low bed trailer comprising a generally U-shaped frame having a longitudinal supporting beam portion disposed at one side of the trailer and transverse arm portions, ground engaging running gear behind and supporting one arm portion of the frame, means carried by the other arm of the said frame for coupling the trailer to a truck-tractor or the like, a load supporting platform disposed between the arm portions of said frame hinged to the longitudinal supporting beam portion thereof pivotally movable from a position in the plane of the frame to an inclined position in which the free edge thereof rests upon or substantially upon the ground, actuator means connected to said platform for moving the same from one position to the other, and adjustable ground engaging props at the coupling end of the trailer for holding said end elevated when the trailer is disengaged from said truck-tractor.

References Cited in the file of this patent

UNITED STATES PATENTS

| | | |
|---|---|---|
| 2,321,198 | Graves | June 8, 1943 |
| 2,530,866 | Evans et al. | Nov. 21, 1950 |
| 2,675,934 | Kennedy | Apr. 20, 1954 |
| 2,720,325 | Kay | Oct. 11, 1955 |
| 2,776,146 | Marino | Jan. 1, 1957 |
| 2,797,928 | Blubaugh | July 2, 1957 |

FOREIGN PATENTS

| | | |
|---|---|---|
| 661,995 | Germany | July 1, 1938 |